(12) United States Patent
Song (10) Patent No.: US 10,766,185 B2
(45) Date of Patent: Sep. 8, 2020

(54) METHODS AND APPARATUS FOR FORMING MICROSCOPIC FEATURES ON A FILM LAYER

(71) Applicant: The Boeing Company, Chicago, IL (US)

(72) Inventor: Weidong Song, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 701 days.

(21) Appl. No.: 14/881,936

(22) Filed: Oct. 13, 2015

(65) Prior Publication Data

US 2017/0100877 A1   Apr. 13, 2017

(51) Int. Cl.
*B29C 59/04* (2006.01)
*B29C 59/02* (2006.01)
*B29L 31/30* (2006.01)

(52) U.S. Cl.
CPC ...... *B29C 59/046* (2013.01); *B29C 2059/023* (2013.01); *B29L 2031/3076* (2013.01)

(58) Field of Classification Search
USPC .......................................................... 264/293
See application file for complete search history.

(56) References Cited

U.S. PATENT DOCUMENTS

| | | | | |
|---|---|---|---|---|
| 3,635,609 A * | 1/1972 | Balamuth | ................ | B01J 19/10 264/443 |
| 4,021,179 A * | 5/1977 | Pira | ........................ | B29C 59/04 425/363 |
| 5,133,516 A * | 7/1992 | Marentic | ................... | B05D 5/02 244/130 |
| 5,183,597 A * | 2/1993 | Lu | ........................... | B29C 35/08 264/1.38 |
| 5,445,095 A * | 8/1995 | Reed | ........................ | B63B 1/34 114/67 A |
| 5,848,769 A * | 12/1998 | Fronek | ..................... | B29D 7/00 244/200 |
| 6,345,791 B1 * | 2/2002 | McClure | ................... | B63B 1/34 244/130 |
| 6,824,630 B2 * | 11/2004 | Oishi | ................... | B23K 20/106 156/73.1 |

(Continued)

OTHER PUBLICATIONS

Zuniga et al., "Flight test results of riblets at supersonic speeds," NASA Technical Memorandum 4387, Jun. 1992 (37 pages).

(Continued)

*Primary Examiner* — Jacob T Minskey
*Assistant Examiner* — Baileigh Kate Darnell
(74) *Attorney, Agent, or Firm* — Hanley, Flight & Zimmerman, LLC (57) ABSTRACT

Methods and apparatus for forming microscopic features on a film layer are disclosed. An example method includes using a surface of a tool to contact a thermoplastic film coupled to an outer surface of a structure. The surface of the tool defines a first microscopic pattern. The example method also includes heating the thermoplastic film by moving the surface of the tool on the thermoplastic film to create friction between the tool and the thermoplastic film and urging the heated thermoplastic film into the first microscopic pattern of the surface of the tool to form a second microscopic pattern in the thermoplastic film.

11 Claims, 6 Drawing Sheets

(56) References Cited

U.S. PATENT DOCUMENTS

| | | | | |
|---|---|---|---|---|
| 7,070,850 | B2* | 7/2006 | Dietz | B32B 27/08 |
| | | | | 428/172 |
| 2002/0123553 | A1* | 9/2002 | Sullivan | B29B 17/0042 |
| | | | | 524/449 |
| 2003/0219602 | A1* | 11/2003 | Kagan | B29C 65/08 |
| | | | | 428/411.1 |
| 2005/0153102 | A1* | 7/2005 | Mazurek | B29C 43/222 |
| | | | | 428/141 |
| 2010/0282909 | A1* | 11/2010 | Rawlings | B32B 15/06 |
| | | | | 244/130 |
| 2011/0120621 | A1* | 5/2011 | Sanchez Blazquez | |
| | | | | B29C 65/5028 |
| | | | | 156/73.1 |
| 2012/0100339 | A1* | 4/2012 | Haynes | B29C 43/222 |
| | | | | 428/141 |
| 2013/0156595 | A1* | 6/2013 | Sander | F01D 5/14 |
| | | | | 416/241 R |
| 2013/0264746 | A1* | 10/2013 | Park | B29C 59/002 |
| | | | | 264/442 |
| 2014/0130318 | A1* | 5/2014 | Rohr | B32B 7/12 |
| | | | | 29/17.2 |
| 2014/0342029 | A1* | 11/2014 | Hsu | B29D 11/00788 |
| | | | | 425/385 |
| 2015/0140309 | A1* | 5/2015 | Pricone | B29C 59/022 |
| | | | | 428/220 |

OTHER PUBLICATIONS

Dean, "The Effect of Shark Skin Inspired Riblet Geometries on Drag in Rectangular Duct Flow," Doctoral dissertation, The Ohio State University, 2011 (86 pages).

* cited by examiner

METHODS AND APPARATUS FOR FORMING MICROSCOPIC FEATURES ON A FILM LAYER

FIELD OF THE DISCLOSURE

This patent relates generally to microscopic features and, more particularly, to methods and apparatus for forming microscopic features on a film layer.

BACKGROUND

Aircraft often include wings having outer surfaces with microscopic features (e.g., scales, riblets, ridge-like structures, etc.). In some instances, the microscopic features increase laminar airflow and reduce turbulent airflow along the wings to reduce aerodynamic drag forces exerted by the airflow, thereby enabling the aircraft to travel more efficiently during flight. In some instances, the microscopic features of the outer surface of the wings deteriorate and/or become damaged over time. The deteriorated and/or damaged microscopic features of the wings may increase drag forces and, thus, reduce efficiency of the aircraft during flight.

SUMMARY

In one example, a method includes using a surface of a tool to contact a thermoplastic film coupled to an outer surface of a structure. The surface of the tool defines a first microscopic pattern. The example method also includes heating the thermoplastic film by moving the surface of the tool on the thermoplastic film to create friction between the tool and the thermoplastic film and urging the heated thermoplastic film into the first microscopic pattern of the surface of the tool to form a second microscopic pattern in the thermoplastic film.

In another example, an apparatus includes a tool and an outer surface of the tool to engage a thermoplastic film applied to a surface of a structure. The outer surface is to move on the thermoplastic film to heat the thermoplastic film by creating friction between the outer surface and the thermoplastic film to increase a temperature of the thermoplastic film. The example apparatus also includes a first microscopic pattern defined by the outer surface of the tool. The outer surface is to move along the surface of the structure to urge the heated thermoplastic film into the first microscopic pattern of the tool to form a second microscopic pattern in the thermoplastic film.

In another example, an apparatus includes means for heating a thermoplastic film coupled to an outer surface of a structure. The means for heating is to move on the thermoplastic film to create friction between the means for heating and the thermoplastic film. The example apparatus also includes means for forming a microscopic pattern in the thermoplastic film. The means for heating is to urge the heated thermoplastic film into the means for forming to form the microscopic pattern in the thermoplastic film.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Many known aircraft (e.g., passenger aircraft, freight aircraft, military aircraft, etc.) include wings having outer surfaces with microscopic features (e.g., scales, riblets, ridge-like structures, etc.). For example, some known aircraft include microscopic features defined in a layer of material that is coupled to an outer surface of the aircraft. Such known microscopic features may increase laminar airflow along the wings to enable the aircraft to travel more efficiently during flight. For example, microscopic features may direct airflow along a surface of a wing to increase laminar airflow and reduce turbulent airflow (e.g., airflow perpendicular to the laminar airflow) along the wing. In some instances, turbulent airflow along the wing of the aircraft creates aerodynamic drag forces that reduce efficiency (e.g., increase operating and/or fuel costs, increase noxious engine emissions, etc.) of the aircraft during flight. Thus, some known microscopic features of aircraft increase the efficiency (e.g., reduce operating and/or fuel costs, reduce noxious engine emissions, etc.) of the aircrafts during flight by reducing the turbulent airflow along the wings. For example, some known microscopic features of aircraft wings increase laminar flow and, thus, increase efficiency when the aircraft is travelling at high speed.

The microscopic features of some known aircraft may become damaged and/or deteriorate. For example, the microscopic features may become damaged upon an object striking a surface of the aircraft wing and/or may deteriorate as a result of airflow forces exerted on the wing wearing down the microscopic features over time. The deteriorated and/or damaged microscopic features of the aircraft wings may decrease the laminar flow and increase the turbulent flow along the wings, thereby reducing the efficiency of the aircraft. Thus, upon deteriorating and/or becoming damaged, the layers that have the microscopic features are removed from the aircraft and are replaced with another layer to maintain the efficiency of the aircraft.

Example methods and apparatus disclosed herein form microscopic patterns in a thermoplastic film or layer that is coupled to a surface of a structure (e.g., an aircraft wing, an interior surface of an aircraft, etc.). The example methods and apparatus enable damaged microscopic patterns to be reformed in the thermoplastic film and, thus, repaired without having to remove a damaged layer of material from the surface of the structure.

Examples disclosed herein include a tool having an outer surface that is to contact a thermoplastic film or layer coupled to a surface of a structure. The outer surface of the tool defines a microscopic pattern (e.g., scales, riblets, ridge-like structures, etc.) that is to form a microscopic pattern (e.g., scales, riblets, ridge-like structures, etc.) in the thermoplastic film. Upon contacting the thermoplastic film, the outer surface of the tool is moved on (e.g., rotated on, vibrated on) the thermoplastic film to heat (e.g., increase a temperature, soften, melt, liquefy) the thermoplastic film by creating friction between the tool and the thermoplastic film. Further, to form the microscopic pattern in the thermoplastic film, the outer surface of the tool moves along the surface of the structure to urge the heated thermoplastic film into the microscopic pattern of the tool.

The example tool described herein may be composed of titanium carbide, carbide steel, carbide, tungsten, iron carbide and/or any other substantially hard material to deter, impede and/or prevent the tool from deforming and/or becoming damaged while forming the microscopic pattern in the thermoplastic film. In some examples, the tool is a roller that is to rotate on the thermoplastic film at about between 1,800 and 3,000 revolutions per minute to create friction to heat and, thus, soften the thermoplastic film. In other examples, the tool is a pad that is to vibrate on the thermoplastic film at about 20,000 Hz to create the friction that heats the thermoplastic film.

Further, to create the friction that heats the thermoplastic film, the tool of the examples disclosed herein may apply a pressure to the thermoplastic film. In some examples, a pressure applied by the tool is adjustable to create sufficient friction to heat the thermoplastic film. Additionally or alternatively, the tool is to apply the pressure to the thermoplastic film to urge the heated thermoplastic film into the microscopic pattern of the outer surface of the tool to form the microscopic pattern in the thermoplastic film. Further, in some examples, a pad that is adjacent the tool is to move along the surface of the structure as the tool moves along the surface of the structure. In such examples, the pad adjacent the tool includes an outer surface having a microscopic pattern that is aligned with the microscopic pattern of the tool and is to engage the heated thermoplastic film to further form the microscopic pattern in the thermoplastic film.

Example microscopic patterns formed in the thermoplastic film have a U-shaped profile or a V-shaped profile. In some examples, the thermoplastic film having the microscopic pattern is coupled to an outer surface of an aircraft (e.g., an outer surface of an aircraft wing) to reduce a drag force produced by the outer surface of the aircraft. Additionally or alternatively, the microscopic pattern of the thermoplastic film coupled to the aircraft wing prevents and/or impedes moisture from collecting and/or ice from forming on the aircraft wing to improve airflow along the aircraft wing. In other examples, the thermoplastic film having the microscopic pattern is coupled to an inner surface of an aircraft to prevent bacteria from forming within the aircraft by preventing and/or impeding moisture from collecting on the inner surface of the aircraft.

Figure 1:
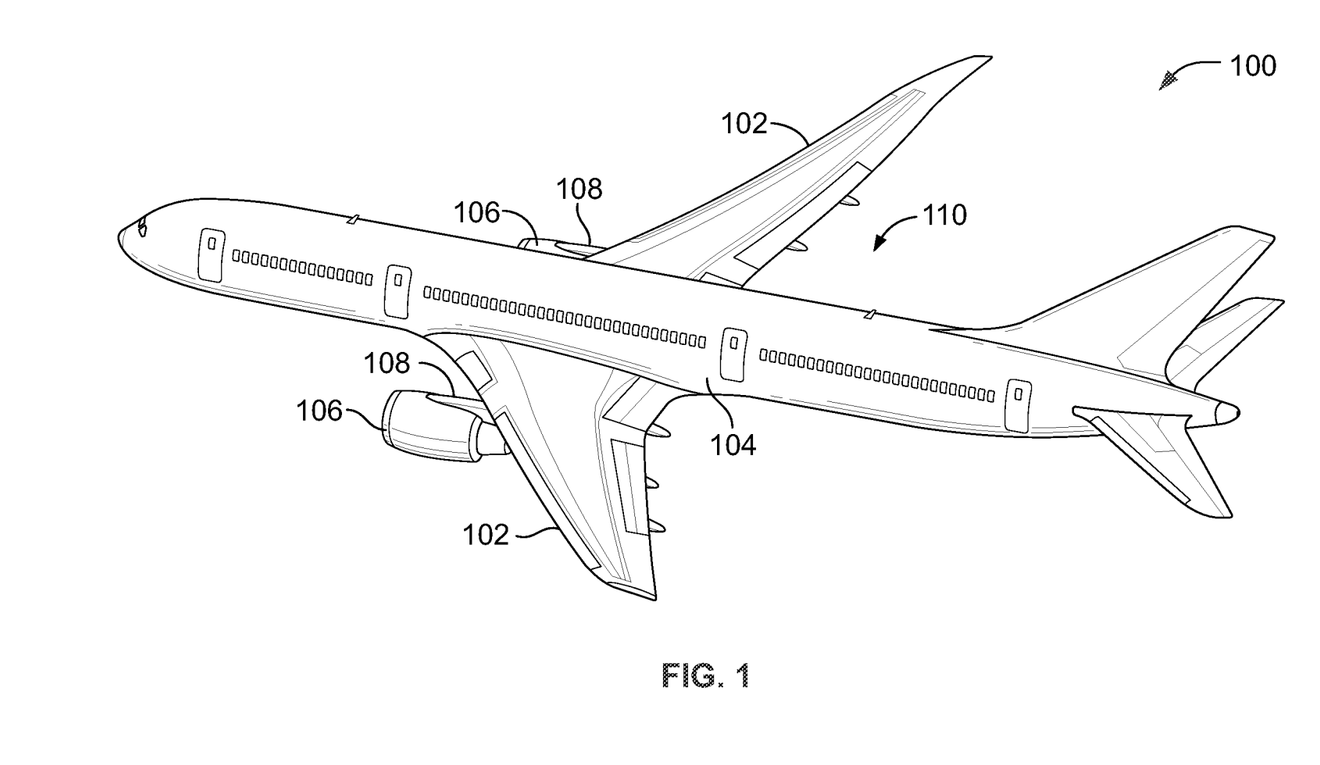
FIG. 1 depicts an example aircraft constructed in accordance with the teachings disclosed herein.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, etc.) is disposed within the fuselage 104 of the illustrated example.

Figure 2A:
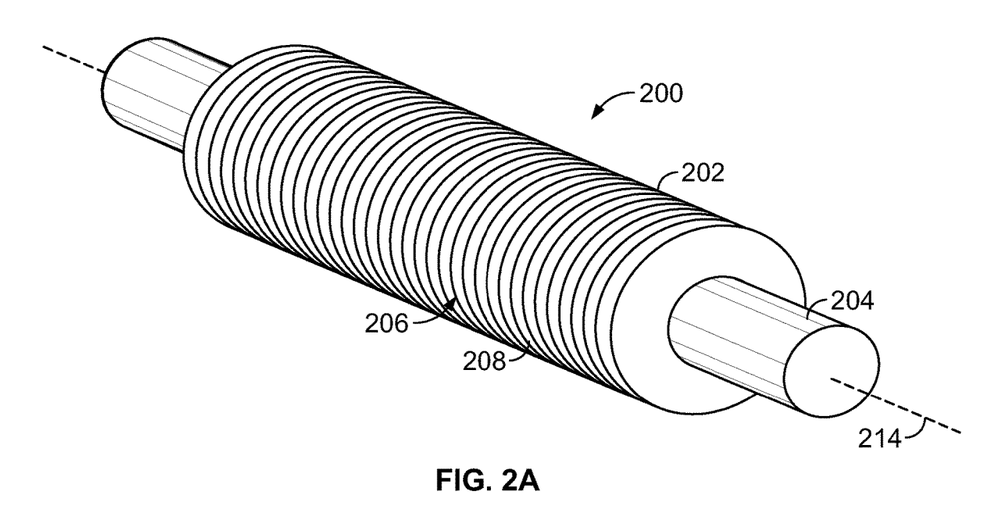
FIG. 2A is a perspective view of an example tool in accordance with the teachings herein.
Figure 2B:
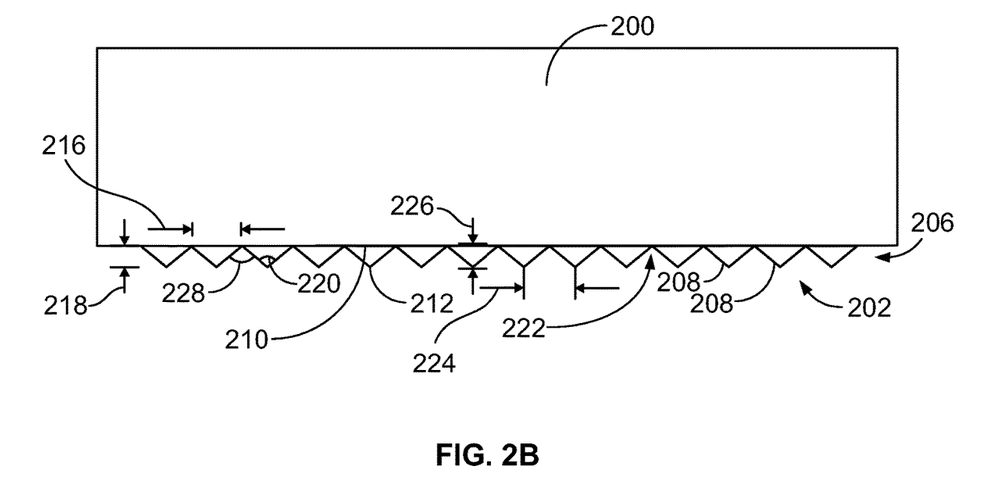
FIG. 2B is an enlarged, cross-sectional view of a microscopic pattern of an outer surface of the example tool of FIG. 2.

FIGS. 2A-2B illustrate an example tool 200 in accordance with the teachings herein. In particular, FIG. 2A is a perspective view of the tool 200, and FIG. 2B is an enlarged, cross-sectional view of a portion of an outer surface 202 the tool 200.

As illustrated in FIG. 2A, the example tool 200 is a cylindrical roller that is coupled to a shaft 204. For example, the tool 200 is integrally formed with the shaft 204, is mechanically and/or adhesively fixed to the shaft 204 and/or defines an aperture that fixedly receives the shaft 204. In the illustrated example, the outer surface 202 of the tool 200 is a circumferential surface. As illustrated in FIG. 2A, the outer surface 202 defines a first microscopic pattern 206. The microscopic pattern 206 of the illustrated example includes riblets 208 that extend in parallel around the circumferential outer surface 202 of the tool 200. Additionally or alternatively, the microscopic pattern 206 defined by the outer surface 202 of the tool 200 may include scales, ridge-like structures and/or any other pattern formed by grooves, depressions, channels, detents, corrugations, etc.

As illustrated in FIG. 2B, the example riblets 208 have substantially similar V-shaped profiles. For example, each of the riblets 208 has a triangular cross-section with dimensions that are substantially similar to those of the other riblets 208 of the microscopic pattern 206. In the illustrated example, each of the riblets 208 has a base 210 and an apex 212 extending away from a center axis 214 of the tool 200. For example, each of the riblets 208 has a width 216 (e.g., a length of the base 210) and a depth 218 (e.g., a distance between the base 210 and the apex 212 of the riblet 208). The widths 216 and the depths 218 of the example riblets 208 are not limited to any particular dimensions and may vary based on characteristics of the microscopic patterns to be formed by the tool 200. In some examples, the widths 216 of the riblets 208 are about 74 μm (0.0029 inches), and the depths 218 of the riblets 208 are about 41 μm (0.0016 inches). In some examples, the widths 216 are about 61 μm (0.0024 inches), and the depths 218 are about 58 μm (0.0023 inches). Further, as illustrated in FIG. 2B, the apex 212 of each of the respective riblets 208 defines an angle 220. The angles 220 of the respective riblets 208 are not limited to any particular angle and may vary based on characteristics of the microscopic patterns to be formed by the tool 200. In some examples, the angles 220 of the apexes 212 are about between 30 degrees and 120 degrees (e.g., 30 degrees, 45 degrees, 60, degrees, 90 degrees, 105 degrees, etc.).

In the illustrated example, the riblets 208 are positioned in a side-by-side manner such that the base 210 of one of the riblets 208 contacts the bases 210 of other adjoining riblets 208. As illustrated in FIG. 2B, openings, valleys, corrugations, gaps or spaces 222 are defined between the adjoining riblets 208. For example, the openings 222 are to receive heated thermoplastic to form a microscopic pattern (e.g., a second microscopic pattern 400 of FIG. 4) in a thermoplastic film or layer (e.g., a thermoplastic film 302 of FIG. 3). In the illustrated example, each of the openings 222 has a width 224 (e.g., defined by a distance between the apexes 212 of the adjoining riblets 208), a depth 226 (e.g., defined by a distance between one of the apexes 212 and one of the bases 210 of the adjoining riblets 208), and an angle 228 (e.g., defined by the adjoining riblets 208). In the illustrated example, the riblets 208 and the openings 222 have substantially similar V-shaped profiles. For example, the widths 216 of the riblets 208 are substantially equal to the widths 224 of the openings 222, the depths 218 of the riblets 208 are substantially equal to the depths 226 of the openings 222, and the angles 220 of the riblets 208 are substantially equal to the angles 228 of the openings 222.

Figure 3:
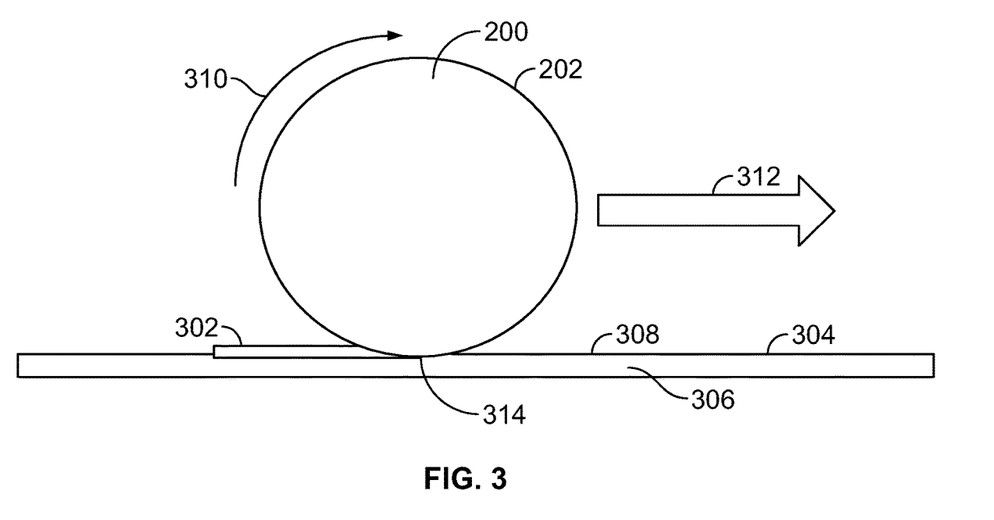
FIG. 3 is a cross-sectional view of the example tool of FIGS. 2A-2B in contact with a thermoplastic film.

FIG. 3 illustrates the example tool 200 in contact with the thermoplastic film 302 to form a microscopic pattern (e.g., the second microscopic pattern 400 of FIG. 4) in the thermoplastic film 302. As illustrated in FIG. 3, the thermoplastic film 302 is coupled to an outer surface 304 of a structure 306 via a substrate layer 308. The structure 306 is, for example, an outer surface of an aircraft (e.g., the wings 102 of the aircraft 100 of FIG. 1), an interior surface of an aircraft (e.g., an interior surface of the fuselage 104 and/or a surface within the compartment 110 of the aircraft 100 of FIG. 1) and/or any other surface on which a microscopic pattern is to be formed. For example, the structure 306 may be composed of a metallic material, a thermoset plastic material, a composite material, etc. As illustrated in FIG. 3, the substrate layer 308 is coupled to the outer surface 304 of the structure 306 to enable the thermoplastic film 302 to couple, adhere and/or be fixed to the structure 306. The substrate layer 308 is composed of, for example, a metallic material (e.g., an aluminum alloy) and/or a composite material (e.g., a honeycomb layer).

As illustrated in FIG. 3, the outer surface 202 of the tool 200 engages the thermoplastic film 302 to form the microscopic pattern 400 (FIG. 4) in the thermoplastic film 302. In the illustrated example, the tool 200 has a diameter of about 1.0 inch. The tool 200 is composed of, for example, titanium carbide, carbide steel, carbide, tungsten, iron carbide, and/or any other hard material that deters, impedes and/or prevents deformation of the tool 200 over time. For example, the tool 200 is composed of a substantially hard material that deters, impedes and/or prevents the microscopic pattern 206 (FIG. 2) of the outer surface 202 of the tool 200 from deforming and/or wearing down as the tool 200 rotates on and/or applies pressure to the thermoplastic film 302.

In operation, the tool 200 maintains engagement to and rotates (e.g., moves) on the thermoplastic film 302 to heat and/or increase a temperature of the thermoplastic film 302 via friction. In the illustrated example, the tool rotates in a clockwise direction 310. In other examples, the tool 200 may rotate in a counterclockwise direction. To heat the thermoplastic film 302 via friction, the tool 200 of the illustrated example rotates at a substantially high rotational speed such as between about 1800 and 3000 revolutions per minute. The tool 200 of the illustrated example heats the thermoplastic film 302 via friction until the thermoplastic 302 film becomes malleable. For example, when the thermoplastic film 302 is composed of DuPont™ Hytrel® material, the tool 200 heats the thermoplastic film 302 to about 370 degrees Fahrenheit to make the thermoplastic film 302 malleable. In some examples, the tool 200 softens, melts and/or liquefies the thermoplastic film 302. Further, the tool 200 of the illustrated example creates the friction that heats the thermoplastic film 302 by applying a pressure to the thermoplastic film 302. In the illustrated example, the tool 200 applies a pressure of about between 68.9 kPa (10 psi) and 689.5 kPa (100 psi). In some examples, the tool 200 includes a heating element to further heat the thermoplastic film 302. For example, the heating element (e.g. a metallic heating element, a ceramic heating element, a composite heating element) is composed of a high-resistance material (e.g., metallic material, ceramic material, composite material) that converts electrical energy to thermal energy. In some such examples, the heating element is disposed in the tool 200 such that the heating element heats the material of the tool 200 which, in turn, heats the thermoplastic film 302 in contact with the tool 200.

Upon heating the thermoplastic film 302 to malleability, the tool 200 maintains engagement with the thermoplastic film 302 and moves along the outer surface 304 of the structure 306 in a direction 312. For example, the tool 200 rotates and/or rolls on the thermoplastic film 302 to roll along (e.g., move along) the outer surface 304 of the structure 306. The movement (e.g., rotation, rolling, etc.) of the tool 200 urges the heated thermoplastic film 302 into the microscopic pattern 206 of the tool 200 at a contact area 314 between the outer surface 202 of the tool 200 and the thermoplastic film 302. Additionally or alternatively, the pressure applied by the tool 200 to the thermoplastic film 302 urges the heated thermoplastic film 302 into the microscopic pattern 206 of the tool 200. As the tool 200 moves along the structure 306 in the direction 312, the thermoplastic film 302 that was urged into the microscopic pattern 206 at the contact area 314 disengages from the tool 200 and sets to form the microscopic pattern 400 of FIG. 4 in the thermoplastic film 302.

Figure 4:
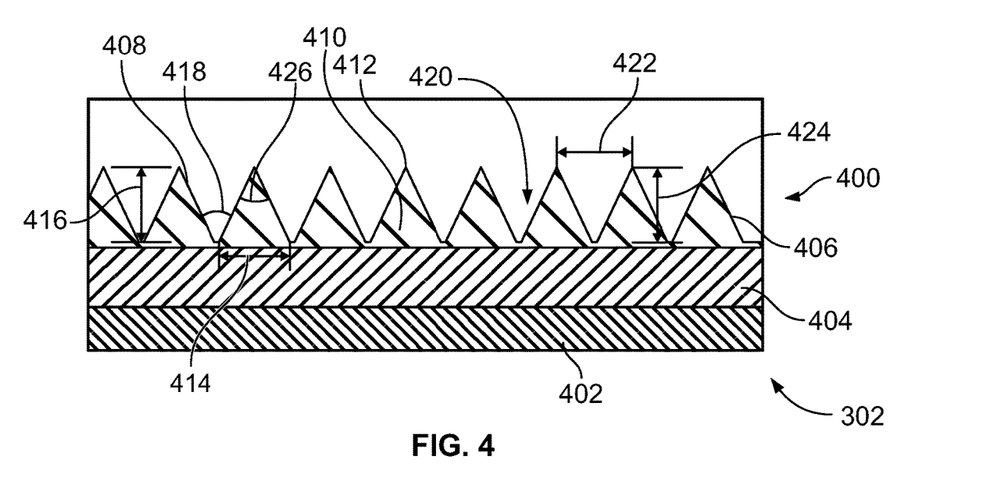
FIG. 4 is an enlarged, cross-sectional view of a microscopic pattern formed in the thermoplastic film of FIG. 3 by the tool of FIGS. 2A-3 in accordance with the teachings herein.

FIG. 4 is an enlarged view of a portion of the second microscopic pattern 400 formed in the thermoplastic film 302. As illustrated in FIG. 4, the thermoplastic film 302 includes an inner layer 402, a middle layer 404, and an outer layer 406. The inner layer 402 adheres to the substrate layer 308 (FIG. 3) to enable the thermoplastic film 302 to couple to the structure 306 (FIG. 3). The inner layer 402 is composed of, for example, an adhesive material. In the illustrated example, the inner layer 402 has a thickness of about 155 μm (0.0061 inches). The middle layer 404 of the thermoplastic film 302 is positioned between the inner layer 402 and the outer layer 406 to provide a transition between the inner layer 402 and the outer layer 406. The middle layer 404 is composed of, for example, a polyurethane material. In the illustrated example, the middle layer 404 has a thickness of about 61 μm (0.0024 inches). As illustrated in FIG. 4, the microscopic pattern 400 is formed in the outer layer 406 of the thermoplastic film 302. The outer layer 406 is composed of, for example, a fluoropolymer material. In the illustrate example, the outer layer 406 has a thickness of about 58 μm (0.0023 inches).

As illustrated in FIG. 4, the microscopic pattern 400 includes riblets 408. Additionally or alternatively, the microscopic pattern 400 formed in the thermoplastic film 302 may include scales, ridge-like structures and/or any other pattern formed by grooves, depressions, channels, detents, etc.

The microscopic pattern 400 of the thermoplastic film 302 is formed by the microscopic pattern 206 (FIG. 2B) of the tool 200 (FIGS. 2A-3). As a result, the riblets 408 of the microscopic pattern 400 have substantially similar cross-sections and dimensions as the openings 222 (FIG. 2B) of the microscopic pattern 206 of the tool 200. For example, each of the riblets 408 of the microscopic pattern 400 has a triangular cross-section and dimensions that are substantially similar to those of the other riblets 408 of the microscopic pattern 400. In the illustrated example, each of the riblets 408 has a base 410 and an apex 412 extending away from the inner layer 402 of the thermoplastic film 302. For example, each of the riblets 408 has a width 414 (e.g., a length of the base 410) and a depth 416 (e.g., a distance between the base 410 and the apex 412 of the riblet 408). The widths 414 and the depths 416 of the example riblets 408 are not limited to any particular dimensions and may vary based on the structure 306 onto which the microscopic pattern 400 is to be formed. In some examples, the widths 414 are about 74 μm (0.0029 inches), and the depths 416 are about 41 μm (0.0016 inches). In some examples, the widths 414 are about 61 μm (0.0024 inches), and the depths 416 are about 58 μm (0.0023 inches).

Further, as illustrated in FIG. 4, the apex 412 of each of the riblets 408 defines an angle 418. Because the microscopic pattern 400 of the thermoplastic film 302 is formed by the microscopic pattern 206 of the tool 200, the angles 418 of the riblets 408 formed in the thermoplastic film 302 are substantially similar to the angles 228 of the openings 222 of the microscopic pattern 206. The angles 418 of the example microscopic pattern 400 are not limited to any particular angle and may vary based on the structure 306 onto which the microscopic pattern 400 is to be formed. In some examples, the angles 418 are about between 30 degrees and 120 degrees (e.g., 30 degrees, 45 degrees, 60, degrees, 90 degrees, 105 degrees, etc.).

As illustrated in FIG. 4, the riblets 408 are positioned in a side-by-side manner such that the base 410 of one of the riblets 408 contacts the bases 410 of adjoining riblets 408 of the microscopic pattern 400. Corrugations, valleys, openings, gaps or spaces 420 are defined between the adjoining riblets 408. For example, each of the corrugations 420 has a width 422 (e.g., defined by a distance between the apexes 418 of the adjoining riblets 408), a depth 424 (e.g., defined by a distance between the one of the apexes 412 and one of the bases 410 of the adjoining riblets 408), and an angle 426 (e.g., formed by sides of the adjoining riblets 408). Because the microscopic pattern 400 of the thermoplastic film 302 is formed by the microscopic pattern 206 of the tool 200, the dimensions of the corrugations 420 of the microscopic pattern 400 are substantially similar to the dimensions of the riblets 208 (FIG. 2B) of the microscopic pattern 206.

Further, in some examples, the depths 218 (FIG. 2B) of the riblets 208 of the tool 200 are less than a thickness of the thermoplastic film 302 to prevent the outer surface 202 (FIGS. 2A-3) of the tool 200 from contacting and damaging the substrate layer 308 (FIG. 3) and/or the outer surface 304 (FIG. 3) of the structure 306. As a result, the depths 424 of the corrugations 420 of the example microscopic pattern 400 are less than the thickness of the thermoplastic film 302.

In examples in which the structure 306 to which the thermoplastic film 302 is coupled is an aircraft wing (e.g., one of the wings 102 of FIG. 1), the riblets 408 of the microscopic pattern 400 increase laminar airflow along the wing 102 by directing the airflow through the corrugations 420 and reduce turbulent flow along the aircraft 100 by deterring air from flowing in a direction perpendicular and/or otherwise non-parallel to the riblets 408. The reduced turbulent airflow along the wing 102 reduces aerodynamic drag forces along the wing 102 and, thus, increases efficiency (e.g., reduced operating and/or fuel costs, reduced noxious engine emissions, etc.) of the aircraft 100 during flight. Further, the microscopic pattern 400 deters moisture from collecting and/or ice from forming on the wing 102 of the aircraft 100, for example, to increase lift produced by the wing 102. In examples in which the structure 306 to which the thermoplastic film 302 is coupled is an interior surface of an aircraft (e.g., an interior surface of the fuselage 104 and/or a surface within the compartment 110 of the aircraft 100 of FIG. 1), the microscopic pattern 400 deters moisture from collecting on the interior surface to prevent bacteria from forming within the aircraft 100. For example, the microscopic pattern 400 deters moisture from collecting on the surface by reducing a contact surface area between the microscopic pattern 400 and liquid contacting the microscopic pattern 400. The reduced contact surface area enables a surface tension of the liquid to form the liquid into a bead or droplet that is to slide along, roll off and/or otherwise repel the microscopic pattern 400.

Figure 5:
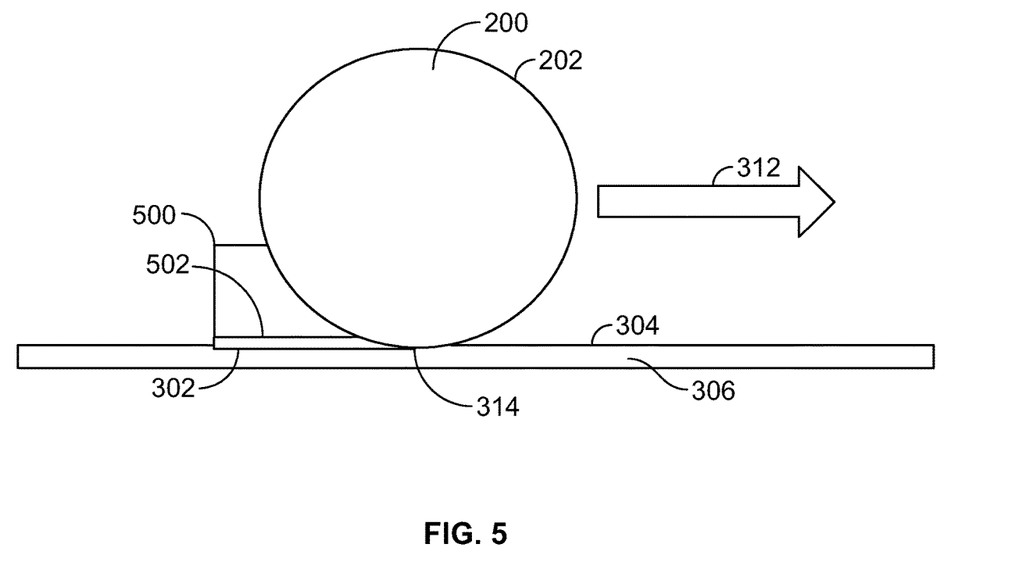
FIG. 5 is a cross-sectional view of the example tool of FIGS. 2A-3 having a pad in contact with the thermoplastic film of FIG. 3 to further form the microscopic pattern of FIG. 4.

FIG. 5 illustrates an example pad 500 adjacent the tool 200. The pad 500 includes a surface 502 that contacts the thermoplastic film 302 adjacent the contact area 314 of the tool 200 and the thermoplastic film 302. The surface 502 of the pad 500 defines a third microscopic pattern that is, for example, substantially similar to the microscopic pattern 206 (FIG. 2B) of the tool 200. For example, the surface 502 of the pad 500 defines riblets and openings that align with the riblets 208 (FIG. 2B) and the openings 222 (FIG. 2B) of the microscopic pattern 206 (FIG. 2B) of the tool 200. The pad 500 is composed of, for example, titanium carbide, carbide steel, carbide, tungsten, iron carbide, and/or any other hard material that deters, impedes and/or prevents deformation of the pad 500 over time. For example, the pad 500 is composed of a substantially hard material that deters, impedes and/or prevents the surface 502 of the pad 500 from deforming and/or wearing down as the pad 500 moves along the outer surface 304 of the structure 306.

In operation, the pad 500 slides along the thermoplastic film 302 in the direction 312 as the tool 200 rolls along the outer surface 304 of the structure 306 in the direction 312. For example, the pad 500 slides along the thermoplastic film 302 that was previously heated by the tool 200. In the illustrated example, the pad 500 is positioned behind the contact area 314 of the tool 200 and the thermoplastic film 302 relative to the direction 312 of movement. As a result, the surface 502 of the tool pad 500 engages the heated thermoplastic film 302 after the outer surface 202 of the tool 200 disengages that portion of the thermoplastic film 302. In turn, the surface 502 of the pad 500 slides on the heated thermoplastic film 302 to further form a microscopic pattern (e.g., the microscopic pattern 400 of FIG. 4, a second microscopic pattern 700 of FIG. 7, a second microscopic pattern 800 in FIG. 8, etc.) in the thermoplastic film 302.

Figure 6:
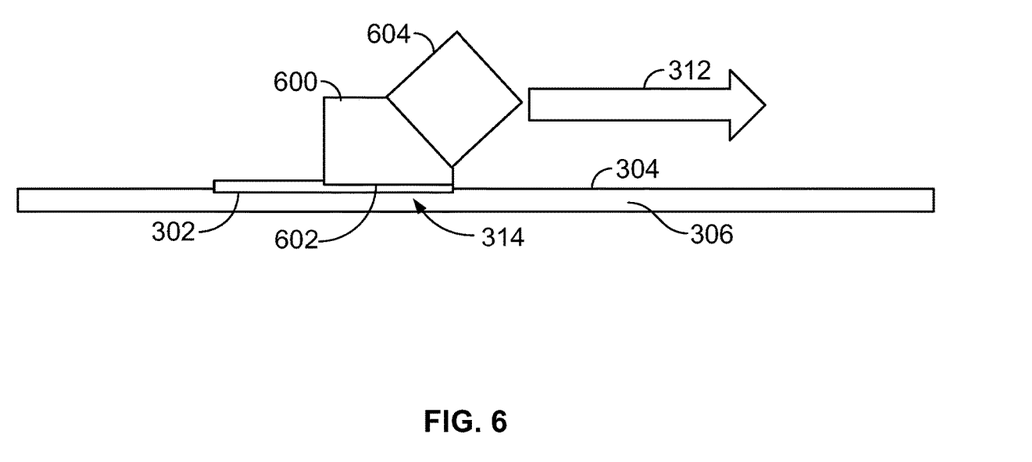
FIG. 6 is a cross-sectional view of another example tool to form the microscopic pattern of FIG. 4 in the thermoplastic film of FIG. 3 in accordance with the teachings herein.

FIG. 6 illustrates another example tool 600 in accordance with the teachings herein. In the illustrated example, the tool 600 is a pad. As illustrated in FIG. 6, the tool 600 includes a surface 602 that engages the thermoplastic film 302. The surface 602 of the pad 600 of the illustrated example defines a first microscopic pattern (e.g., the microscopic pattern 206 of FIG. 2) that is to form a microscopic pattern (e.g., the second microscopic pattern 400 of FIG. 4, the second microscopic pattern 700 of FIG. 7, the second microscopic pattern 800 in FIG. 8, etc.) in the thermoplastic film 302. The tool 600 is composed of, for example, titanium carbide, carbide steel, carbide, tungsten, iron carbide, and/or any other hard material that deters, impedes and/or prevents deformation of the tool 600 over time. For example, the tool 600 is composed of a substantially hard material that deters, impedes and/or prevents the surface 602 of the tool 600 from deforming and/or wearing down as the tool 600 engages the thermoplastic film 302. As illustrated in FIG. 6, an actuator 604 (e.g., an ultrasonic actuator) is coupled to the tool 600.

The actuator 604 of the illustrated example causes the tool 600 to vibrate, for example, at substantially high frequencies (e.g. about 20,000 Hz).

In operation, the surface 602 of the tool 600 engages the thermoplastic film 302. The actuator 604 causes the tool 600 to vibrate (e.g., move) on the thermoplastic film 302 to heat and/or increase a temperature of the thermoplastic film 302 via friction until the thermoplastic film 302 becomes malleable (e.g., softens, melts, liquefies, etc.). For example, the actuator 604 causes the tool 600 to vibrate on the thermoplastic film 302 at a substantially high frequency (e.g., at about 20,000 Hz) to heat the thermoplastic film 302 via friction. Further, the tool 600 of the illustrated example applies a pressure to the thermoplastic film 302 to create the friction that heats the thermoplastic film 302. For example, the tool 600 of FIG. 6 may apply a pressure of about between 68.9 kPa (10 psi) and 689.5 kPa (100 psi) to heat the thermoplastic film 302 to malleability. In some examples, the tool 600 includes a heating element to further heat the thermoplastic film 302. For example, the heating element is composed of a high-resistance material that converts electrical energy to thermal energy. In some such examples, the heating element is disposed in the tool 600 such that the heating element heats the material of the tool 600 which, in turn, heats the thermoplastic film 302 in contact with the tool 600.

Upon heating the thermoplastic film 302 to malleability, the tool 600 maintains engagement with the thermoplastic film 302 and moves along the outer surface 304 of the structure 306 in the direction 312. For example, the tool 600 slides on the thermoplastic film 302 along the thermoplastic film 302 in the direction 312. Movement of the tool 600 along the heated thermoplastic film 302 urges the heated thermoplastic film 302 into the microscopic pattern of the surface 602 of the tool 600 at a contact area 606 between the surface 602 of the tool 600 and the thermoplastic film 302. Additionally or alternatively, the tool 600 applies pressure to the thermoplastic film 302 to urge the heated thermoplastic film 302 into the microscopic pattern of the surface 602 of the tool 600. As the tool 600 moves in the direction 312, the thermoplastic film 302 that was urged into the microscopic pattern of the tool 600 disengages from the tool 600 and sets to form the microscopic pattern (e.g., the microscopic pattern 400 of FIG. 4, the microscopic pattern 700 of FIG. 7, the microscopic pattern 800 in FIG. 8, etc.) in the thermoplastic film 302.

Thus, in combination with the thermoplastic film 302, the tool 200 of FIG. 3, the tool 200 and the pad 500 of FIG. 5 and/or the tool 600 of FIG. 6 enable a microscopic pattern (e.g., the second microscopic pattern 400 of FIG. 4, the second microscopic pattern 700 of FIG. 7, the second microscopic pattern 800 in FIG. 8, etc.) to be formed in the thermoplastic film 302 when the thermoplastic film 302 is coupled to the outer surface 304 structure 306. As a result, the tool 200 of FIG. 3, the tool 200 and the pad 500 of FIG. 5 and/or the tool 600 of FIG. 6 enables a deteriorated and/or damaged microscopic pattern to be repaired without having to remove a layer (e.g., a layer having the damaged microscopic pattern) from the structure 306. For example, when a microscopic pattern is damaged and/or deteriorated, the tool 200 of FIG. 3, the tool 200 and the pad 500 of FIG. 5 and/or the tool 600 of FIG. 6 heats the thermoplastic film 302 to malleability and reforms an undamaged microscopic pattern in the heated thermoplastic film 302 without removing the thermoplastic film 302 from the structure 306. In some examples, the tool 200 of FIG. 3, the tool 200 and the pad 500 of FIG. 5 and/or the tool 600 of FIG. 6 enable the microscopic pattern to be reformed in a field environment of the structure 306, thereby reducing time and costs involved in repairing the damaged microscopic pattern.

Figure 7:
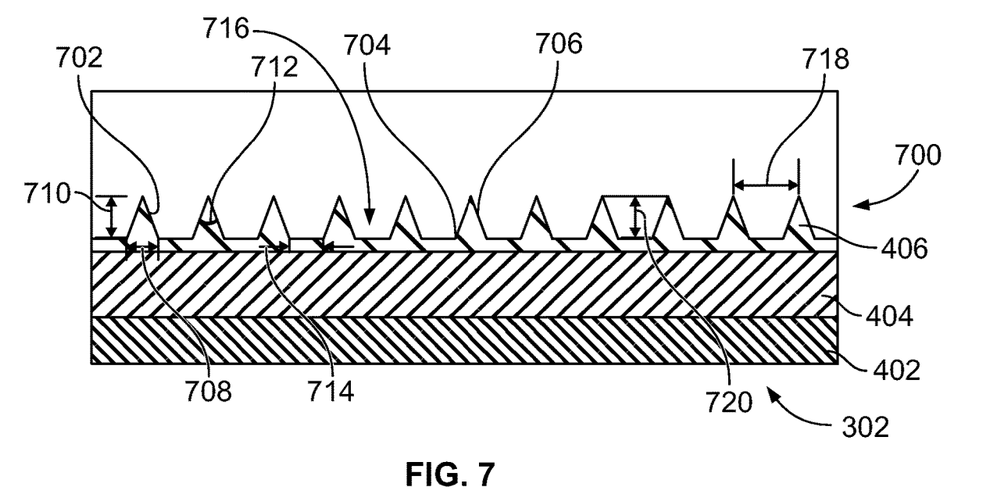
FIG. 7 is an enlarged, cross-sectional view of another microscopic pattern formed in the thermoplastic film of FIG. 3 by the tool of FIGS. 3, 5 and/or 6 in accordance with the teachings herein.

FIG. 7 is an enlarged, cross-sectional view of another second microscopic pattern 700 formed in the thermoplastic film 302 in accordance with the teachings herein. For example, the microscopic pattern 700 of FIG. 7 may be formed via a microscopic pattern of a tool (e.g., a tool similar to the tool 200 of FIG. 3, the tool 200 and the pad 500 of FIG. 5 and/or the tool 600 of FIG. 6) having an inverted cross-section relative to a cross-section of the microscopic pattern 700.

The thermoplastic film 302 of FIG. 7 includes the inner layer 402, the middle layer 404, and the outer layer 406. As illustrated in FIG. 7, the microscopic pattern 700 is formed in the outer layer 406 of the thermoplastic film 302. In the illustrated example, the inner layer 402 has a thickness of about 160 μm (0.0063 inches), the middle layer 404 has a thickness of about 74 μm (0.0029 inches), and the outer layer 406 has a thickness of about 41 μm (0.0016 inches).

As illustrated in FIG. 7, the microscopic pattern 700 includes riblets 702. The riblets 702 of the illustrated example are formed by a microscopic pattern of a tool (e.g., a tool similar to the tool 200 of FIG. 3, the tool 200 and the pad 500 of FIG. 6, the tool 600 of FIG. 6, etc.) that has a cross-section inverted to that of the microscopic pattern 700. As a result, the riblets 702 have substantially similar cross-sections and dimensions to openings of the microscopic pattern of the tool. In the illustrated example, the riblets 702 of the microscopic pattern 700 have triangular cross-sections. For example, each of the riblets 702 has a base 704 and an apex 706 extending away from the inner layer 402 of the thermoplastic film 302. As illustrated in FIG. 7, each of the riblets 702 has a width 708 and a depth 710. In the illustrated example, the widths 708 of the respective riblets 702 are about 20 μm (0.0008 inches) and the depths 710 of the respective riblets 702 are about 38 μm (0.0015 inches). Further, as illustrated in FIG. 7, the apex 706 of each of the riblets 702 defines an angle 712. In the illustrated example, the angles 712 of the respective apexes 706 are about 30 degrees. The widths 708, the depths 710, the angles 712 and/or any other features of the example riblets 702 are not limited to any particular dimensions and may vary based on the structure 306 (FIGS. 3, 5 and/or 6) onto which the microscopic pattern 700 is to be formed.

The riblets 702 of the illustrated example are spaced apart by a distance 714 such that none of the riblets 702 contacts a portion of any of the other riblets 702 of the microscopic pattern 700 (e.g., the base 704 of one of the riblets 702 does not contact the base 704 of any of the other riblets 702). As illustrated in FIG. 7, corrugations, valleys, openings, gaps or spaces 716 are defined between adjacent sets of the riblets 702. In the illustrated example, each of the corrugations 716 has a width 718 and a depth 720. In the illustrated example, the widths 718 of the corrugations 716 is about 76 μm (0.0030 inches) and the depths 720 of the corrugations 716 are about 38 μm (0.0015 inches). The widths 718, the depths 720, and/or any other features of the example riblets 702 are not limited to any particular dimensions and may vary based on the structure 306 (FIGS. 3, 5 and/or 6) onto which the microscopic pattern 700 is to be formed.

Figure 8:
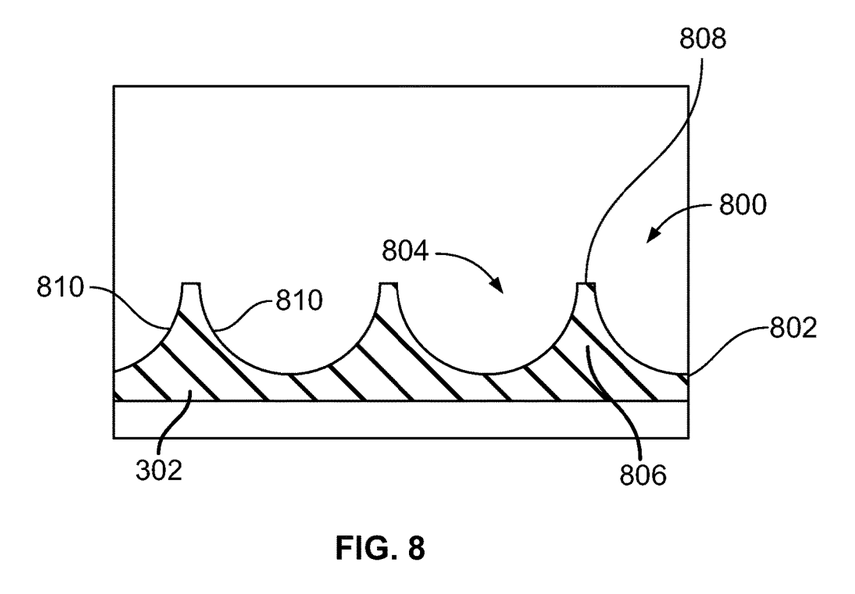
FIG. 8 is an enlarged, cross-sectional view of another microscopic pattern formed in the thermoplastic film of FIG. 3 by the tool of FIGS. 3, 5 and/or 6 in accordance with the teachings herein.

FIG. 8 is a cross-sectional view of another second microscopic pattern 800 formed in the thermoplastic film 302 in accordance with the teachings herein. The microscopic pattern 800 of FIG. 8 may be formed by a microscopic pattern of a tool (e.g., a tool similar to the tool 200 of FIG. 3, the tool 200 and the pad 500 of FIG. 5 and/or the tool 600 of FIG. 6) having an inverted cross-section relative to a cross-section of the microscopic pattern 800.

For example, the microscopic pattern 800 includes riblets 802 and corrugations, valleys, openings, gaps or spaces 804 that are formed by openings and riblets, respectively, of a microscopic pattern of a tool (e.g., a tool similar to the tool 200 of FIG. 3, the tool 200 and the pad 500 of FIG. 6, the tool 600 of FIG. 6) that has a cross-section inverted to that of the microscopic pattern 800. As a result, the riblets 802 of the illustrated example have substantially similar cross-sections and dimensions as the openings of the microscopic pattern of the corresponding tool, and the corrugations 804 have substantially similar cross-sections and dimensions as the riblets of the microscopic pattern of the corresponding tool. In the illustrated example, the corrugations 804 have substantially similar U-shaped profiles that are formed by substantially U-shaped openings of a microscopic pattern of a surface of a tool (e.g., the outer surface 202 the tool 200 of FIGS. 2B, 3 and 5, the surface 502 of the pad 500 of FIG. 5, the surface 602 of the tool 600 of FIG. 6). For example, the riblets 802 of the microscopic pattern 800 formed in the thermoplastic film 302 have generally triangular cross-sections. Each of the example riblets 802 has a base 806 and an apex 808 extending away from the base 806. Further, as illustrated in FIG. 8, the riblets 802 of the microscopic pattern 800 have concave side walls 810 that define convex cross-sections of the corrugations 804 of the microscopic pattern 800. The riblets 802 and the corrugations of FIG. 8 are not limited to any particular dimensions and may vary based on the structure 306 (FIGS. 3, 5, and 6) onto which the thermoplastic film 302 is to be formed.

In examples in which the thermoplastic film 302 is coupled to an aircraft wing (e.g., one of the wings 102 of FIG. 1), the second microscopic pattern 700 of FIG. 7 and/or the second microscopic pattern 800 of FIG. 8 increases laminar airflow and reduces turbulent airflow along the wing 102 to reduce aerodynamic drag forces and, thus, increase efficiency of the aircraft 100 during flight. Further, the microscopic pattern 700 of FIG. 7 and/or the microscopic pattern 800 of FIG. 8 deters moisture from collecting and/or ice from forming on the wing 102 of the aircraft 100. In examples in which the thermoplastic film 302 of FIG. 7 and/or FIG. 8 is coupled to an interior surface of an aircraft (e.g., an interior surface of the fuselage 104 and/or a surface within the compartment 110 of the aircraft 100 of FIG. 1), the respective microscopic pattern 700 and/or 800 deters moisture from collecting on the surface to prevent bacteria from forming within the aircraft 100. For example, the microscopic patterns 700, 800 deter moisture from collecting on the surface by reducing a contact surface area between the microscopic patterns 700, 800 and liquid contacting the microscopic patterns 700, 800. The reduced contact surface area enables a surface tension of the liquid to form the liquid into a bead or droplet that is to slide along, roll off and/or otherwise repel the microscopic patterns 700, 800.

Figure 9:
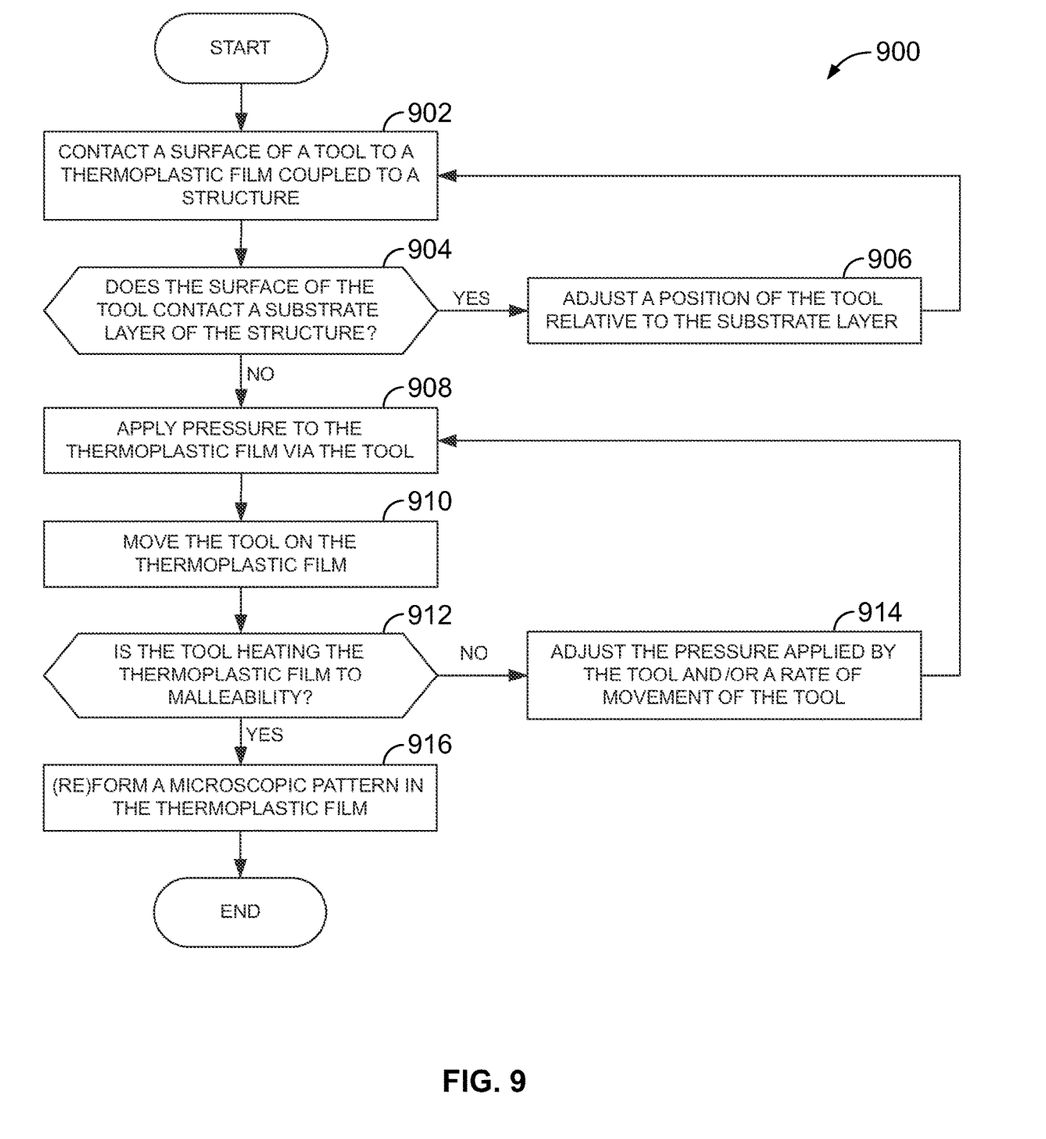
FIG. 9 is a flowchart representative of an example method to form the microscopic pattern of FIGS. 4, 7 and/or 8 in the thermoplastic film of FIG. 3 via the example tool of FIGS. 3, 5 and/or 6 in accordance with the teachings herein.

FIG. 9 is a flowchart representative of an example method 900 to form a microscopic pattern in a thermoplastic film via a tool. Although the example method 900 is described with reference to the flowchart illustrated in FIG. 9, many other methods of forming a microscopic pattern in a thermoplastic film via a tool may alternatively be used. For example, the order of execution of the blocks may be changed, and/or some of the blocks described changed, eliminated, and/or combined.

The example method 900 for forming a microscopic pattern in a thermoplastic film is discussed in connection with the example second microscopic pattern 400 of FIG. 4, the example second microscopic pattern 700 of FIG. 7 and/or the example second microscopic pattern 800 of FIG. 8. Further, because the example method 900 may use the example tool 200 of FIGS. 2A-3 and 5, the example pad 500 of FIG. 5 and/or the example tool 600 of FIG. 6 to form a microscopic pattern, components identified in FIGS. 2A-8 having functions substantially similar or identical to the functions of components described below will not be described in detail again. Instead, the same reference numbers will be used for like structures.

The example method 900 disclosed herein starts by using a surface of a tool to contact a thermoplastic film that is coupled to a structure. In the illustrated example, the thermoplastic film is coupled to the structure via a substrate layer. For example, the outer surface 202 of the tool 200 (FIGS. 2A-3 and 5), the surface 502 of the pad 500 (FIG. 5) and/or the surface 602 of the tool 600 (FIG. 6) is to contact the thermoplastic film 302 (FIGS. 3-8) that is coupled to the structure 306 (FIGS. 3 and 5-6) (e.g., an outer surface of the wing 102 of the aircraft 100 of FIG. 1, an interior surface within the fuselage 104 of the aircraft 100, a surface within the compartment 110 of the aircraft 100 and/or any other structure) via the substrate layer 300 (FIG. 3).

At block 904, to prevent the tool from damaging the substrate layer, the example method 900 determines whether the surface of the tool contacts the substrate layer. If the tool is contacting the substrate layer, the position of the tool is adjusted relative to the substrate layer (block 906). Blocks 904, 906 are repeated until the tool does engage the thermoplastic film without contacting the substrate layer.

Once the tool engages the thermoplastic film without contacting the substrate layer, pressure is applied to the thermoplastic film via the tool (block 908). For example, a pressure of about between 68.9 kPa (10 psi) and 689.5 kPa (100 psi) is applied to the thermoplastic film via the tool. At block 910, the tool is moved (e.g., rotated, vibrated, etc.) on the thermoplastic film to heat and/or increase a temperature of the thermoplastic film via friction. For example, to create the friction that heats the thermoplastic film, the tool 200 (FIGS. 2A-3 and 5) is rotated at about between 1,800 and 3,000 revolutions per minute and/or the tool 600 (FIG. 6) is vibrated at a frequency of about 20,000 Hz. Additionally, some example tools include heating elements that are to further heat the thermoplastic film.

At block 912, the example method 900 determines whether the tool is heating the thermoplastic film to malleability. If the thermoplastic film is not malleable, the pressure applied to the thermoplastic film via the tool and/or the rate of movement (e.g., rotational velocity and/or acceleration, vibration frequency, etc.) of the tool is adjusted to heat the thermoplastic film to malleability (block 914). Blocks 908, 910, 912, 914 are repeated until the thermoplastic film becomes malleable.

At block 916, a microscopic pattern is formed and/or reformed in the thermoplastic film. For example, the microscopic pattern 400 (FIG. 4), the microscopic pattern 700 (FIG. 7) and/or the microscopic pattern 800 (FIG. 8) is formed and/or reformed in the thermoplastic film 302 (FIGS. 3-8). To form and/or reform the microscopic pattern, the heated thermoplastic film is urged into a microscopic pattern (e.g., the first microscopic pattern 206 of FIG. 2B, the third microscopic pattern of the surface 502 of the pad 500 of FIG. 5, the first microscopic pattern of the surface 602 of the tool 600 of FIG. 6) of the surface of the tool. For example, the heated thermoplastic film is urged into the microscopic pattern of the tool by applying pressure onto the thermoplastic film via the tool and/or by moving (e.g., rolling, sliding, etc.) the tool on the thermoplastic film.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A method comprising:
    using a surface of a tool to contact a thermoplastic film coupled to an outer surface of a structure, the surface of the tool defining a first microscopic pattern;
    rotating the surface of the tool on the thermoplastic film at a rotational speed sufficient to create friction between the tool and the thermoplastic film to heat the thermoplastic film to malleability; and
    urging the heated thermoplastic film into the first microscopic pattern of the surface of the tool to form a second microscopic pattern in the thermoplastic film.

2. The method of claim 1, further including applying pressure to the heated thermoplastic film via the tool to at least one of create the friction between the tool and the thermoplastic film or urge the heated thermoplastic film into the first microscopic pattern of the surface of the tool.

3. The method of claim 1, further including adjusting a pressure applied by the tool on the thermoplastic film to heat the thermoplastic film.

4. The method of claim 1, further including heating the thermoplastic film by applying a heating element of the tool to the thermoplastic film.

5. The method of claim 1, wherein heating the thermoplastic film to malleability includes at least one of softening, melting or liquefying the thermoplastic film.

6. The method of claim 1, wherein rotating the surface of the tool on the thermoplastic film includes rotating the tool on the thermoplastic film at about between 1,800 and 3,000 revolutions per minute.

7. The method of claim 1, wherein rotating the surface of the tool along the outer surface on the thermoplastic film includes engaging the thermoplastic film without engaging a substrate layer to which the thermoplastic film is coupled.

8. The method of claim 1, wherein forming the second microscopic pattern in the thermoplastic film includes forming corrugations having a U-shaped profile or a V-shaped profile.

9. The method of claim 1, wherein forming the second microscopic pattern in the thermoplastic film includes reforming a damaged microscopic pattern of the thermoplastic film.

10. The method of claim 1, wherein the structure is an aircraft and wherein forming the second microscopic pattern in the thermoplastic film includes forming the second microscopic pattern on the outer surface of the aircraft to reduce a drag force produced by the outer surface of the aircraft.

11. The method of claim 1, wherein forming the second microscopic pattern in the thermoplastic film of the structure impedes moisture from collecting on the structure.

* * * * *